United States Patent [19]

Hotle

[11] Patent Number: 5,218,689
[45] Date of Patent: Jun. 8, 1993

[54] SINGLE DISK EMULATION INTERFACE FOR AN ARRAY OF ASYNCHRONOUSLY OPERATING DISK DRIVES

[75] Inventor: Thomas G. Hotle, Chippewa Falls, Wis.

[73] Assignee: Cray Research, Inc., Eagan, Minn.

[21] Appl. No.: 897,600

[22] Filed: Jun. 10, 1992

Related U.S. Application Data

[63] Continuation of Ser. No. 644,474, Jan. 18, 1991, abandoned, which is a continuation of Ser. No. 282,455, Dec. 8, 1988, abandoned, which is a continuation-in-part of Ser. No. 232,862, Aug. 16, 1988, abandoned.

[51] Int. Cl.$^5$ .................................................. G06F 13/00
[52] U.S. Cl. ............................... 395/425; 395/275; 395/500; 364/DIG. 2; 364/926.92; 364/926.93; 364/927.95; 364/927.97; 364/927.99; 364/939.3; 364/948.33; 364/950.1; 364/952.1; 364/957.9; 364/959; 364/959.3; 364/961.2; 364/966.3; 364/968; 360/98.01
[58] Field of Search ............... 364/DIG. 1, DIG. 2; 395/400, 425, 500, 275; 360/49, 98.01

[56] References Cited

U.S. PATENT DOCUMENTS

| | | |
|---|---|---|
| Re. 28,923 | 8/1976 | Patel ............................. 340/146.1 AL |
| Re. 30,187 | 1/1980 | Hong et al. ................... 340/146.1 AL |
| 3,274,561 | 9/1966 | Hallman et al. .................. 340/172.5 |
| 3,290,654 | 12/1966 | Rettig et al. ............................ 364/200 |
| 3,432,813 | 3/1969 | Annunziata et al. ............. 340/172.5 |
| 3,623,155 | 11/1971 | Hsiao et al. ...................... 340/146.1 |
| 3,699,524 | 10/1972 | Norberg ............................. 340/172.5 |
| 3,725,864 | 4/1973 | Clark et al. ....................... 340/172.5 |
| 3,868,632 | 2/1975 | Hong et al. ................... 340/146.1 AL |
| 3,876,978 | 4/1975 | Bossen et al. ............... 340/146.1 AG |
| 3,913,068 | 10/1975 | Patel ............................. 340/146.1 AL |
| 3,955,180 | 5/1976 | Hirtle ..................................... 364/200 |
| 4,052,698 | 10/1977 | Ragle ............................ 340/146.1 AL |
| 4,087,794 | 5/1978 | Beausoleil et al. .................... 364/900 |
| 4,201,976 | 5/1980 | Patel .......................................... 371/50 |
| 4,205,324 | 5/1980 | Patel .......................................... 371/50 |
| 4,211,997 | 7/1980 | Rudnick et al. ......................... 371/38 |
| 4,257,074 | 3/1981 | Goss ........................................... 360/78 |
| 4,322,793 | 3/1982 | Andersson et al. .................... 364/200 |
| 4,359,772 | 11/1982 | Patel .......................................... 371/39 |
| 4,399,503 | 8/1983 | Hawley ................................... 364/200 |
| 4,413,251 | 11/1983 | Adler et al. ...................... 340/347 DD |

(List continued on next page.)

FOREIGN PATENT DOCUMENTS

| | | |
|---|---|---|
| 1227880 | 10/1987 | Canada . |
| 1228677 | 10/1987 | Canada . |
| 0081961 | 6/1983 | European Pat. Off. . |
| 125561 | 11/1984 | European Pat. Off. . |
| 0147055 | 7/1985 | European Pat. Off. . |
| 0156724 | 10/1985 | European Pat. Off. . |
| 165914 | 12/1985 | European Pat. Off. . |
| 0201330 | 11/1986 | European Pat. Off. . |
| 0242121 | 10/1987 | European Pat. Off. . |
| 0165915 | 12/1987 | European Pat. Off. . |
| 278134 | 8/1988 | European Pat. Off. . |
| 0294287 | 12/1988 | European Pat. Off. . |
| 0320107 | 6/1989 | European Pat. Off. . |
| 3633165 | 4/1987 | Fed. Rep. of Germany . |
| 197664 | 12/1982 | Japan . |
| 6257227 | 9/1988 | Japan . |

OTHER PUBLICATIONS

Wilson, R., "Designers Rescue Superminicomputers from I/O Bottleneck," *Computer Design*, vol. 26, No. 18, pp. 61–71 (Oct. 1, 1987).

(List continued on next page.)

*Primary Examiner*—David L. Clark
*Assistant Examiner*—Matthew C. Fagan
*Attorney, Agent, or Firm*—Merchant, Gould, Smith, Edell, Welter & Schmidt

[57] ABSTRACT

A multiple disk drive array storage device emulates the operation of a single disk drive. The array storage device includes a large buffer memory and a plurality of asynchronously-operating disk drives. A full physical track of data from each of the disk drives within the array is stored within the buffer memory and concatenated to create a large logical track of data. The large buffer memory and asynchronously-operating disk drives results in a data transfer rate that is faster than the standard disk drive architecture.

8 Claims, 11 Drawing Sheets

U.S. PATENT DOCUMENTS

| | | | |
|---|---|---|---|
| 4,430,712 | 2/1984 | Coulson et al. | 364/200 |
| 4,453,211 | 6/1984 | Askinazi et al. | 364/200 |
| 4,467,373 | 8/1984 | Taylor et al. | 360/38.1 |
| 4,467,421 | 8/1984 | White | 364/200 |
| 4,468,730 | 8/1984 | Dodd et al. | 364/200 |
| 4,476,526 | 10/1984 | Dodd | 364/200 |
| 4,476,527 | 10/1984 | Clayton, IV | 364/200 |
| 4,490,782 | 12/1984 | Dixon et al. | 364/200 |
| 4,509,122 | 4/1985 | Agnew et al. | 364/200 |
| 4,511,963 | 4/1985 | Kantner | 364/200 |
| 4,523,275 | 6/1985 | Swenson et al. | 364/200 |
| 4,525,838 | 6/1985 | Patel | 371/37 |
| 4,583,133 | 4/1986 | Shoji et al. | 360/98.01 |
| 4,590,559 | 5/1986 | Baldwin et al. | 364/414 |
| 4,607,328 | 8/1986 | Furkukawa et al. | 364/200 |
| 4,630,230 | 12/1986 | Sundet | 364/900 |
| 4,642,759 | 2/1987 | Foster | 364/200 |
| 4,644,545 | 2/1987 | Gershenson | 371/38 |
| 4,701,848 | 10/1987 | Clyde | 364/300 |
| 4,722,085 | 1/1988 | Flora et al. | 371/38 |
| 4,761,785 | 8/1988 | Clark et al. | 364/200 |
| 4,771,378 | 9/1988 | Halford | 364/200 |
| 4,780,808 | 10/1988 | Moreno et al. | 364/200 |
| 4,791,641 | 12/1988 | Hillis | 371/38 |
| 4,797,755 | 1/1989 | Baldwin et al. | 360/49 |
| 4,805,173 | 2/1989 | Hillis et al. | 371/38 |
| 4,807,121 | 2/1989 | Halford | 364/200 |
| 4,817,035 | 3/1989 | Timsit | 364/900 |
| 4,843,288 | 6/1989 | Volz et al. | 318/599 |
| 4,849,929 | 7/1989 | Timsit | 364/900 |
| 4,849,978 | 7/1989 | Dishon et al. | 371/51 |
| 4,862,462 | 8/1989 | Zulian | 371/38 |
| 4,870,643 | 9/1989 | Bultman et al. | 371/11.1 |
| 4,899,342 | 2/1990 | Potter et al. | 371/10.1 |
| 4,914,656 | 4/1990 | Dunphy, Jr. et al. | 371/10.2 |
| 4,935,828 | 6/1990 | Frissell | 360/98.01 |
| 4,942,579 | 7/1990 | Goodlander et al. | 371/51 |
| 4,958,351 | 9/1990 | Flora et al. | 371/40.1 |
| 4,972,364 | 11/1990 | Barrett et al. | 395/425 |
| 4,989,205 | 1/1991 | Dunphy, Jr. et al. | 364/200 |
| 4,989,206 | 1/1991 | Dunphy, Jr. et al. | 371/10.1 |
| 5,077,736 | 12/1991 | Dunphy, Jr. et al. | 371/10.1 |
| 5,128,810 | 7/1992 | Halford | 360/39 |

OTHER PUBLICATIONS

Seagate Technology, Arrayed Disc Subsystem, Nov., 1988.

Mike Harris, John Grimsley and Jim Luttrull, DF880/DF848 Banjo Fixed Disk Drives, Aug. 19, 1981.

Cray-2 *Engineering Mantenance Manual, CMM* 0200000, Dec., 1987, pp. 3-18 to 3-19.

Tucker et al., "Architecture and Applications of the Connection Machine," *IEEE Computer,* Aug., 1988, pp. 26-38.

Costlow, "Four Drives, no waiting," *Electronic Engineering Times,* Jun. 6, 1988, pp. 73-74.

*DIPS I/O Interface in DIPS*-1 *Data Channel,* by Yamada et al., Mar-Apr. 1973.

*Intelligent Peripheral Interface-Physical Level,* Oct. 23, 1983.

*Intelligent Peripheral Interface Logical Level 3 for Intelligent I/O,* Dec. 23, 1983.

*IPI Level* 2 *Disk Interface Preliminary Draft,* Jan. 6, 1984.

*Connection Machine Model CM-2 Technical Summary,* Thinking Machines Corporation, Apr. 1987.

*Ampex Scorpio Disk Storage Drive,* Models 48 and 80, Product Description, Sep. 1981.

*Centaurus Parallel Transfer Disk Drive Series,* Product Description, May 1985.

*Centaurus Parallel Transfer Disk Subsystems,* Ampex, 1987.

"*Exhibit* 1A".

*DM-PTD Parallel Transfer Drive Engineering Specification No.* 3308829-01, Ampex, Sep. 1977.

"Thinking Machines Redefines Computing," *Computer Graphics World,* Stephen Porter, Aug. 1987.

"The Connection Machine," *Scientific American,* W. Daniel Hillis, vol. 256, pp. 3-10, Jun. 1987.

Article, "U.S. Awards Computer Contract", *The New York Times,* Wednesday, Nov. 29, 1989.

Thinking Machines Corporation, "Corporate Background", and "Technology Background".

*The Capricorn Disk Drive Series,* Ampex, 1981.

*Preliminary ANSI Working Document No. X3T9.3/87-011,* Revision 1.6, Mar. 9, 1988.

*Sabre 2HP Eight-Inch Disk Drive,* Imprimis, 1988.

*Engineering Specification* 64402900, Revision 1, Magnetic Peripherals, Inc., Sep. 28, 1988.

| PREVIOUS SECTION | | CURRENT SECTION | | CLEAR SECTOR FLAGS | | | |
|---|---|---|---|---|---|---|---|
| C15 | C14 | A5 | A4 | K0 | K1 | K2 | K3 |
| 0 | 0 | 0 | 0 | H | H | H | H |
| 0 | 0 | 0 | 1 | 1 | H | H | H |
| 0 | 0 | 1 | 0 | 1 | 1 | H | H |
| 0 | 0 | 1 | 1 | 1 | 1 | 1 | H |
| 0 | 1 | 0 | 0 | H | 1 | 1 | 1 |
| 0 | 1 | 0 | 1 | H | H | H | H |
| 0 | 1 | 1 | 0 | H | 1 | H | H |
| 0 | 1 | 1 | 1 | H | 1 | 1 | H |
| 1 | 0 | 0 | 0 | H | H | 1 | 1 |
| 1 | 0 | 0 | 1 | 1 | H | 1 | 1 |
| 1 | 0 | 1 | 0 | H | H | H | H |
| 1 | 0 | 1 | 1 | H | H | 1 | H |
| 1 | 1 | 0 | 0 | H | H | H | 1 |
| 1 | 1 | 0 | 1 | 1 | H | H | 1 |
| 1 | 1 | 1 | 0 | 1 | 1 | H | 1 |
| 1 | 1 | 1 | 1 | H | H | H | H |

FIG. 8

SINGLE DISK EMULATION INTERFACE FOR AN ARRAY OF ASYNCHRONOUSLY OPERATING DISK DRIVES

This is a continuation of application Ser. No. 07/644,474, filed Jan. 18, 1991, now abandoned, which is a continuation of application Ser. No. 07/282,455, filed Dec. 8, 1988, now abandoned, which is a continuation-in-part of application Ser. No. 07/232,862, filed Aug. 16, 1988, now abandoned.

BACKGROUND OF THE INVENTION

1. Field of the Invention

This invention relates generally to disk storage for computer systems. In particular, it is directed to an array of asynchronously-operating disk drives that emulate a single logical disk drive.

2. Description of the Prior Art

Disk drives have long been popular mass storage devices. They provide a low cost solution to the problem of non-volatile data storage. Virtually all computer system manufacturers, therefore, provide for disk drives as system peripherals.

The major advantage of disk drives is low cost. This advantage is outweighed for some applications by the disadvantage of insufficient data transfer speed, particularly in supercomputer and other high performance computing environments such as the type manufactured by Cray Research, Inc., the assignee of the present invention. The problems facing a computer system user wishing to increase the data transfer rates of disk drives are not trivial. Up until now, most solutions have sought to incrementally enhance the performance of a single disk drive while retaining the disk drive's basic architecture.

Prior art disk drives are limited in their capacity and speed in transferring data. The prior art lacks high performance disk drives which achieve data transfer rates comparable to the speeds of currently available computers. Prior art disk drives are also limited in their capacity to store data. Arrays of disk drives have been attempted in the prior art, however, they require special foreground or background processing to distribute the data in such a fashion as to take advantage of the array architecture. Thus, there is a need in the art for a high capacity disk drive capable of transferring large amounts of data at high speed, yet not requiring special interfaces for the host computer.

SUMMARY OF THE INVENTION

To overcome the limitations in the prior art discussed above, and to overcome other limitations readily recognizable to those skilled in the art, the present invention provides a high speed data storage device for a computer, the device comprising a plurality of disk drives. Memory means is operatively connected to a computer by a channel interface for transferring data therebetween. The memory means stores a logical track of data. The logical track comprises a plurality of sections corresponding to the plurality of disk drives for storing data of the corresponding disk drive. Each section comprises a plurality of sectors. The memory means further includes address control means for addressing the memory means. A plurality of disk drive controllers are connected to a corresponding section of the memory means and to a corresponding disk drive for instructing the disk drives to complete desired operations. The disk drive controllers and the channel interface provide input to the address control means for allocating locations in said memory means for data storage. Disk multiplexor means is connected to the disk drive controllers for controlling transfers of data between the disk drives and the memory means. The disk multiplexor means receives a command from the computer to request data transfer between the high speed data storage device and the computer. The command includes a read/write head selection, a track position and a logical track sector position utilized to allocate locations in the memory means for data storage. The read/write head selection and the track position are transmitted to the disk drive controllers to instruct the disk drives to select a read/write head and position the read/write head to the track position. A disk drive and a sector position of the disk drive is selected based on the logical track sector position. The disk drive selection and sector position are transmitted to the disk drive controllers for controlling transfer of data between the read/write head at said track position and sector position of the disk drive selected and the logical track of the memory means.

BRIEF DESCRIPTION OF THE DRAWINGS

In the drawings, where like numerals refer to like elements throughout the several views.

FIG. 8 is a boolean truth table for the Buffer-Fill algorithm implemented in the controller.

DETAILED DESCRIPTION OF THE PREFERRED EMBODIMENT

In the following Detailed Description of the Preferred Embodiment, reference is made to the accompanying drawings which form a part hereof, and in which is shown by way of illustration the preferred embodiment in which the invention may be practiced. It is to be understood that other embodiments may be utilized and that structural changes may be made without departing from the scope of the present invention.

Figure 1:
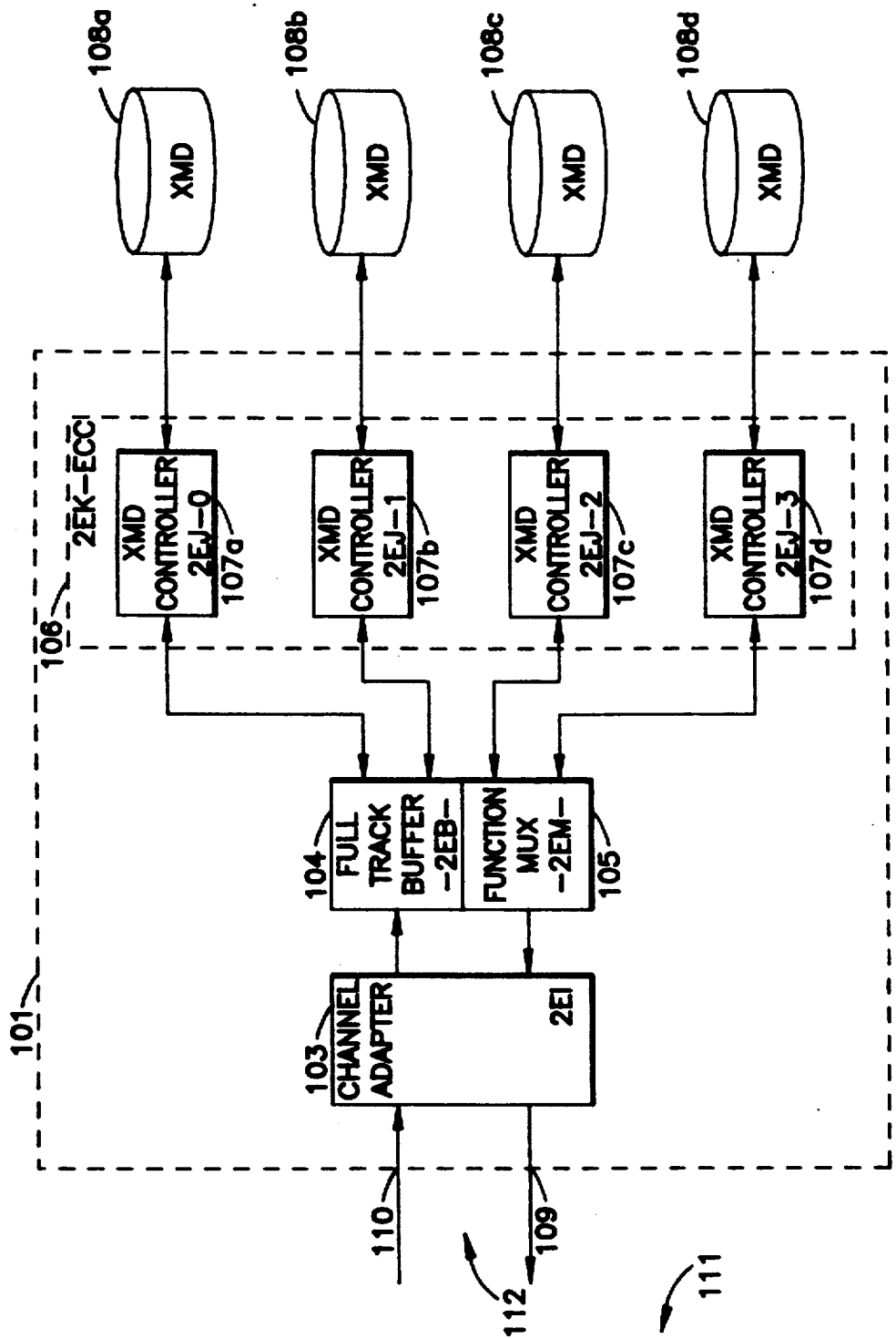
FIG. 1 is a block diagram of the present invention which employs an array of disk drives.

Referring to FIG. 1 initially, the disk controller 101 independently operates the four disk drives 108*a*-108*d*. Each disk drive in array 108 is directed by one of four 2EJ controller modules 107*a*-107*d*. Those skilled in the art will readily recognize, given the teachings of the present invention, that a greater or lesser number of individual disk drives may be combined to form the array 108. The disk controller 101 has buffer memory means capable of storing a logical 48 sector track of data wherein each sector contains 4096 bytes of data. The logical 48 sector track is comprised of four concatenated physical tracks of data. Each physical track, consisting of 12 sectors of data, is stored on one of four disk drives within the array 108. The use of a large buffer memory, and the ability to store or retrieve data in asynchronous and parallel operations on each of the four disk drives, results in a data transfer rate that is faster than the standard disk drive architecture. Those skilled in the art will readily recognize that other size buffer memories may be used and that the amount of data stored on a physical track of an individual disk drive need not be restricted to 12 sectors of 4096 bytes per sector. The disk controller 101 also provides a communications interface to the host computer 111 via an input/output channel 112. This communication includes both control information and data to be stored on the disk storage means 108. Data transfers to or from the host computer 111 can occur independently of data transfers to or from each disk drive in the array 108. To the host computer 111, the present invention appears as a standard disk drive, thereby providing transparent operation and compatibility with existing computer systems.

In the preferred embodiment, each disk controller 101 consists of the following modules: a 2EI channel interface 103; a 2EM disk multiplexor 105; a 2EB full-track buffer 104; a 2EK disk-data and error correction module 106; and four 2EJ controller modules 107a, 107b, 107c and 107d. The disk storage means uses four 14-inch disk drives, labeled as 108a, 108b, 108c, and 108d, to achieve and sustain high data transfer rates.

Assuming the channel transfer rate is greater than the total bandwidth of the disk array, a simple equation can be used to approximate the sustained data transfer rate of the present invention, based upon the number and format of the disk drives in the array:

$$T = \frac{S \times B}{(1 + 1/S) \times R} \times A$$

where
T is the total sustained transfer rate;
S is the number of sectors per track;
B is number of bytes per sector;
A is number of drives in the array; and
R is the time required for 1 revolution of the disk.
Thus, for the preferred embodiment:
S is 12 sectors per track;
B is 4096 bytes per sector;
A is 4 drives in the array;
R is $16.667 \times 10^{-3}$ seconds time required for 1 revolution; and therefore,
T is 10.89 megabytes per second total sustained transfer rate of the preferred embodiment. As a means of comparison, the channel transfer rate in the preferred embodiment approaches 20 megabytes per second and the transfer rate for an individual disk drive in the array 108 is rated at 3 megabytes per second.

The interface protocol between the host computer 111 and the disk controller 101 in the preferred embodiment of the present invention could be of the type described in U.S. Pat. No. 4,771,378 entitled "Electrical Interface System", and assigned to the Assignee of the present invention. Those skilled in the art will readily recognize other interface systems which could be used.

In the preferred embodiment of the present invention, the interface between the controller 101 and the host computer 111 consists of two cables designated Cable 110 and 109. Each cable consists of 24 signals, described as follows:

| Cable (110) | Cable (109) |
|---|---|
| WRITE CLOCK | READ CLOCK |
| FUNCTION/READY | STATUS/DATA READY |
| $CODE_{0-3}$ | ERROR |
| PARITY (CODE) | DONE |
| BUS $OUT_{0-15}$ | READY |
| PARITY (BUS OUT) | INDEX/SECTOR MARK |
| | PARITY (STATUS) |
| | BUS $IN_{0-15}$ |
| | PARITY (BUS IN) |

Signals originating with the host computer 111 are transmitted in Cable 110. Signals originating in the controller 101 are transmitted in Cable 109.

On Cable 110 the signal designated WRITE CLOCK is generated by the host computer 111. It synchronizes the transmission of commands and data to the controller 101. The four CODE signals indicate the function to be performed by the controller 101. These function codes are examined and decoded by the controller 101 only when the FUNCTION/DATA READY is active and the PARITY (CODE) signal indicates there are no errors. The signals BUS $OUT_0$ through BUS $OUT_{15}$ form a 16 bit data bus from the host computer 111 to the disk controller 101. Each time that the signal WRITE CLOCK is active, and the signal FUNCTION/DATA READY is active, the disk controller 101 can read 16 bits of data from the BUS $OUT_{0-15}$ signals. The PARITY (BUS OUT) signal transmits the odd parity value for the BUS $OUT_{0-15}$ signals.

On Cable 109, the signal designated READ CLOCK is generated by the disk controller 101 for the synchronized transfer of status and data to the host computer 111. The signal STATUS/DATA READY is set active by the disk controller 101 when transmitting data or status information on the BUS $IN_{0-15}$ signals to the host computer 111. The signal STATUS/DATA READY is pulsed active for a single READ CLOCK pulse during write functions to indicate the readiness of the disk controller 101 to accept the next transfer. The signal DONE, set active for one pulse of the signal READ CLOCK, indicates the completion of command. The signal ERROR is set active by the disk controller 101 in conjunction with the signal DONE to indicate that at least one error condition occurred during the execution of the current function. The signal READY indicates the availability of the disk controller 101 to accept commands from the host computer 111. Normally, the signal INDEX/SECTOR MARK carries coded index and sector mark information, but, to minimize problems interfacing with the host computer 111, the preferred embodiment does not generate this signal as part of its emulation function. The signal PARITY (STATUS) carries the odd parity value for the combination of signals STATUS/DATA READY, ERROR, DONE and READY. The signals BUS $IN_0$ through BUS $IN_{15}$ form a 16 bit data bus that transmits information from the disk controller 101 to the host computer 111. The signal PARITY (BUS IN) carries the odd parity value for the signals BUS $IN_0$ through BUS $IN_{15}$ during the READ CLOCK pulses where the signal READY is active.

The commands generated by the host computer 111 include SELECT, READ, WRITE, HEAD SELECT, CYLINDER SELECT, DATA TRANSFER, other commands, and diagnostics. These commands are identified by a specific combination of active and inactive CODE signals. Recognition of a command by the disk controller 101 requires an active signal FUNCTION/-DATA READY and a valid signal PARITY (CODE) during a WRITE CLOCK pulse.

When the host computer 111 wants to transfer data to or from the disk controller 101, the first command generated by the host computer 111 is the command SELECT. The binary value transmitted by the BUS $OUT_{0-15}$ signals during a SELECT command must match the logical unit number of the disk controller 101. After the disk controller 101 has been selected by the host computer 111, the next series of commands indicate the head and track address to use during the READ or WRITE operation. The command CYLINDER SELECT identifies which track to use. The command HEAD SELECT, and the signals BUS $OUT_8$ through BUS $OUT_{10}$, indicate which head group to use on those disk drives that support multiple Read/Write heads on a single disk platter stack. Note that this embodiment assumes each individual disk drive in the array 108 is identical to the others, although alternative embodiments need not be so restrictive. Therefore, this embodiment will support multiple head drives and the HEAD SELECT command only if all drives are multiple head drives. Those skilled in the art will readily recognize that single head or single platter disk drives could be substituted for the multiple head, multiple platter disk drives in the array 108.

The READ command initiates the transfer of data from the disk controller 101 to the host computer 111. The READ command is indicated by specific CODE combination and an active FUNCTION/READY signal. The READ command is the implied request for a first data packet (16×16 bits). In order to continue the READ operation, FUNCTION/READY is activated along with the specific CODE combination for "DATA" during a single WRITE CLOCK period. This process is repeated 128 times to read a 4096 byte data sector. When all the data has been transferred, the disk controller 101 responds with an active DONE signal and the ERROR signal is asserted if an error condition occurs. The BUS $OUT_{0-15}$ signals are the parameters to the READ command. The signals BUS $OUT_0$ through BUS $OUT_7$ identify which sector is desired. The signals BUS $OUT_8$ through BUS $OUT_{10}$ indicate which head to select following the execution of the current READ command. The signals BUS $OUT_{12}$ through BUS $OUT_{14}$ indicate a "read option".

The WRITE command transfers data from the host computer 111 to the disk controller 101. The WRITE command is indicated by specific CODE combination and an active FUNCTION/READY signal. The WRITE command is the implied request for the first data packet (16×16 bits). To continue to WRITE operation, FUNCTION/READY is activated along with the specific CODE for "DATA" for a WRITE CLOCK. This process is repeated 128 times to write a 4096 byte data sector. Once all the data has been transferred, the disk controller 101 responds with an active DONE signal. The ERROR signal is asserted later, if and when an errors occurs, while writing the data to a specific disk drive in the array 108.

The BUS $OUT_{0-15}$ signals indicate specific parameters to the WRITE command. The signals BUS $OUT_0$ through BUS $OUT_7$ indicate the specific sector where the data is to be written. The signals BUS $OUT_8$ through BUS $OUT_{10}$ indicate the head which is to be selected following execution of the current WRITE command. The signals BUS $OUT_{12}$ through BUS $OUT_{14}$ indicate the write options.

The 16×16 bit packet approach is preferred due to its higher transmission efficiency, since a minimum amount of handshaking protocol is required for transmitting the digital data. For each request, 16 words of 16-bit data is transmitted in a packet to provide the highly efficient disk channel protocol. This packet transfer technique is described in U.S. Pat. No. 4,771,378 entitled "Electrical Interface System", assigned to the Assignee of the present invention.

Figure 2A:
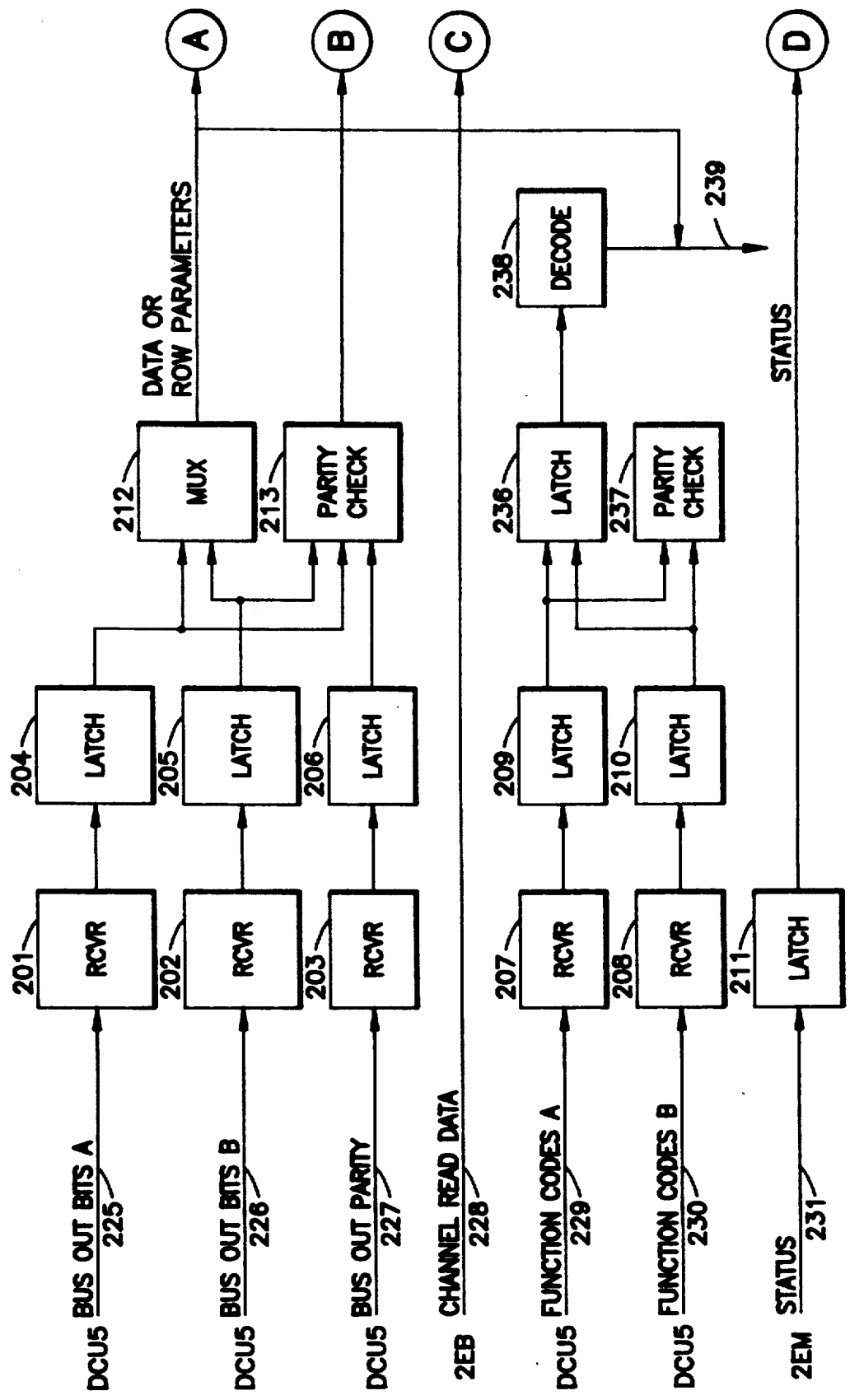
FIGS. 2A and 2B combined are a schematic block diagram of a 2IE channel interface module.
Figure 2B:
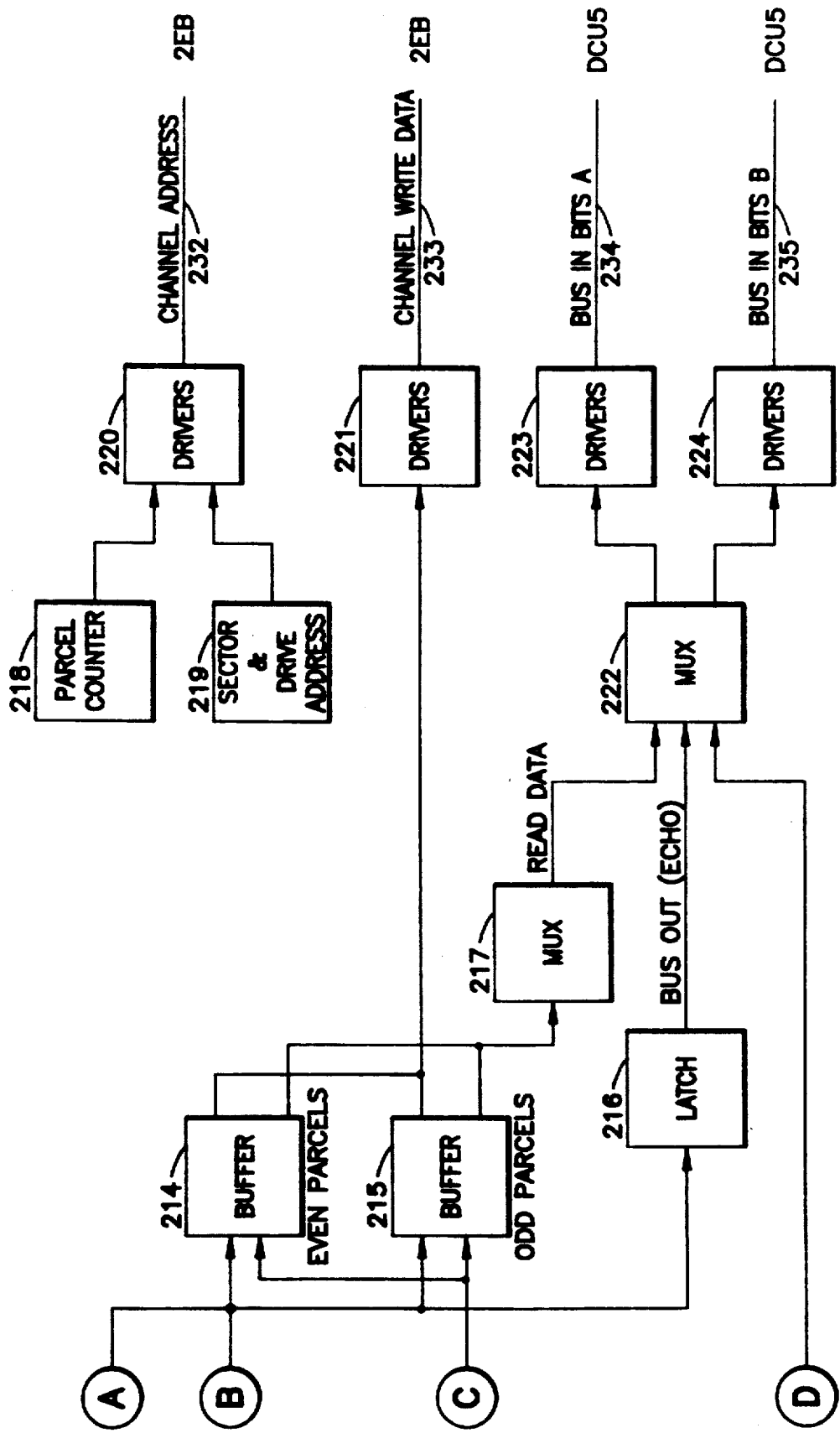

FIGS. 2A and 2B combined are a schematic block diagram of the 2EI channel interface 103. The 2EI channel interface 103 receives data from the input/output channel 112 using Cable 110 and sends it to the 2EB full-track buffer 104. The 2EI channel interface 103 receives data from the 2EB full-track buffer 104 and sends it to the input/output channel 112 using the Cable 109. The 2EI channel interface 103 also performs a function code checking operation upon instructions generated by the host computer 111.

There are two ports on the 2EI channel interface 103, so that data can be received from or sent to two different locations. The ports are generally designated as A or B on lines 225, 226, 229, 230, 234, and 235. Port A or B must be selected before data can be sent through the port. Circuitry (not shown) in the 2EI channel interface 103 controls port contention.

Function codes 229 or 230 from ports A or B enter line receivers 207 or 208 and are subsequently latched in 209 or 210, respectively. The corresponding 16 bit function parameter 225 or 226 enters line receivers 201 or 202 and is latched into 204 or 205. The function code is checked for parity errors at circuit 237. The function parameter is checked for parity errors at circuit 213. The function code is then sent to a function decode circuit 238 via latch 236.

Channel addresses received from the host computer 111 as function parameters specify the locations where the data is to be stored on the disk. These addresses are used to allocate locations in the 2EB full-track buffer 104 that correspond to the disk locations. A parcel counter 218 and sector/drive address 219 are also part of the 2EI channel interface 103 circuitry to control data transfers and buffer allocation.

Data from ports A or B enter line receivers 201 or 202 as 16-bit parcels via lines 225 or 226 and are latched into 204 or 205. Parity is again checked at circuit 213. Control circuitry 212 selects data from one of the latches 204 or 205 and sends it to two buffers 214 and 215. Each of the two buffers holds one 16-bit parcel. The two buffers fill and empty alternately, so that buffer 214 fills while buffer 215 empties, and vice versa. Write data is sent 16-bit parallel to the 2EB full-track buffer 104 through drivers 221 on line 233.

Data is received as 16-bit parallel data from the 2EB full-track buffer 104 on line 228 and held in the same two buffers, 214 and 215. As described herein before, these buffers 214 and 215 fill and empty alternately. The data is then sent to multiplexing circuit 217. Multiplexing circuit 222 places either the data from multiplexing circuit 217, status information from latch 211, or echoed data from latch 216 on lines 234 or 235 for transmittal to the host computer 111 via line drivers 223 or 224.

The status line 231 is sent to the 2EI channel interface 103 from the 2EM disk multiplexor 105. When an operation is completed, the general status code is latched into 211. The general status code is returned to the host computer 111 through multiplexor circuit 222.

Figure 3A:
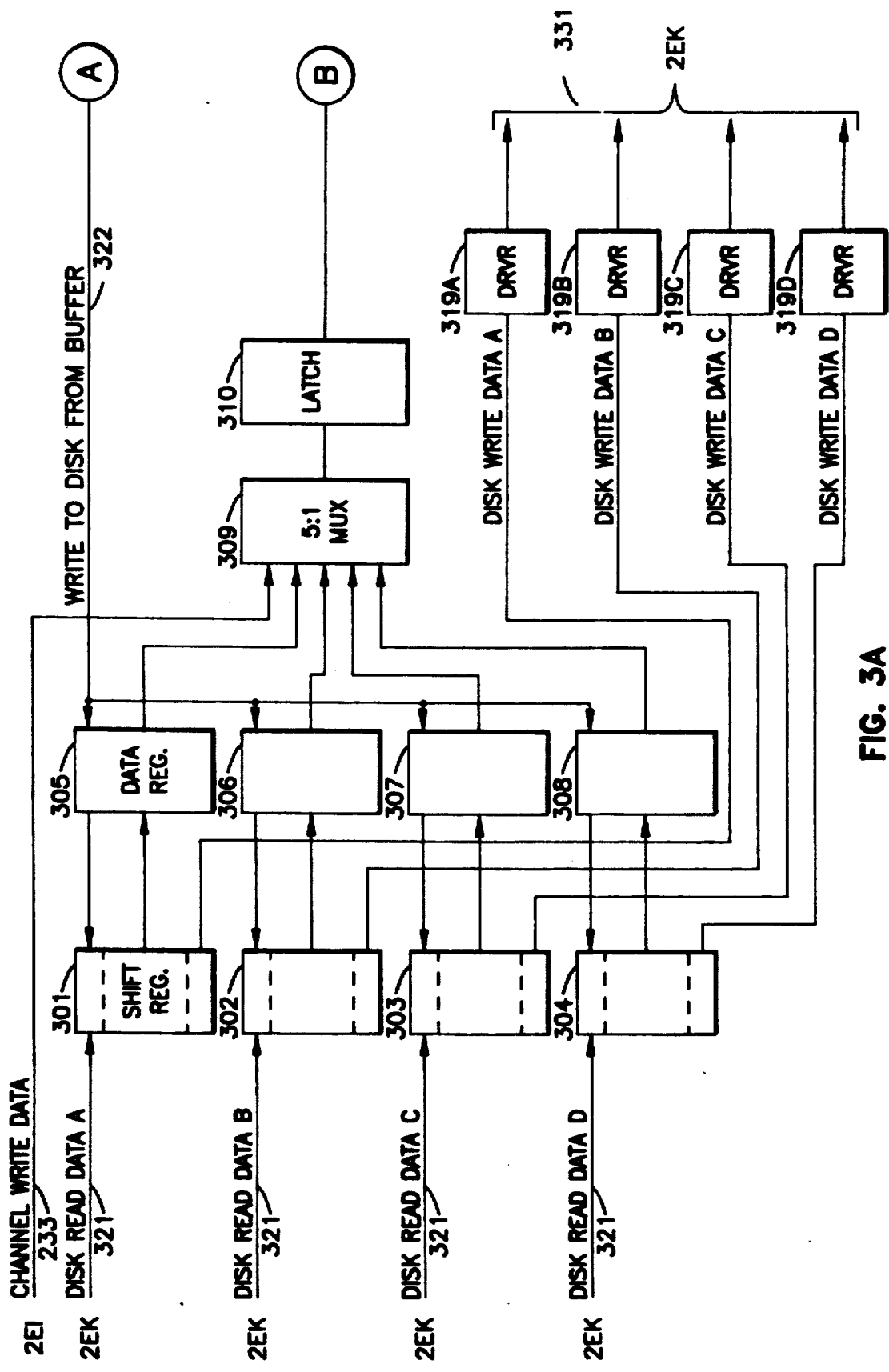
FIGS. 3A and 3B combined are a schematic block diagram of a 2EB full-track buffer module.
Figure 3B:
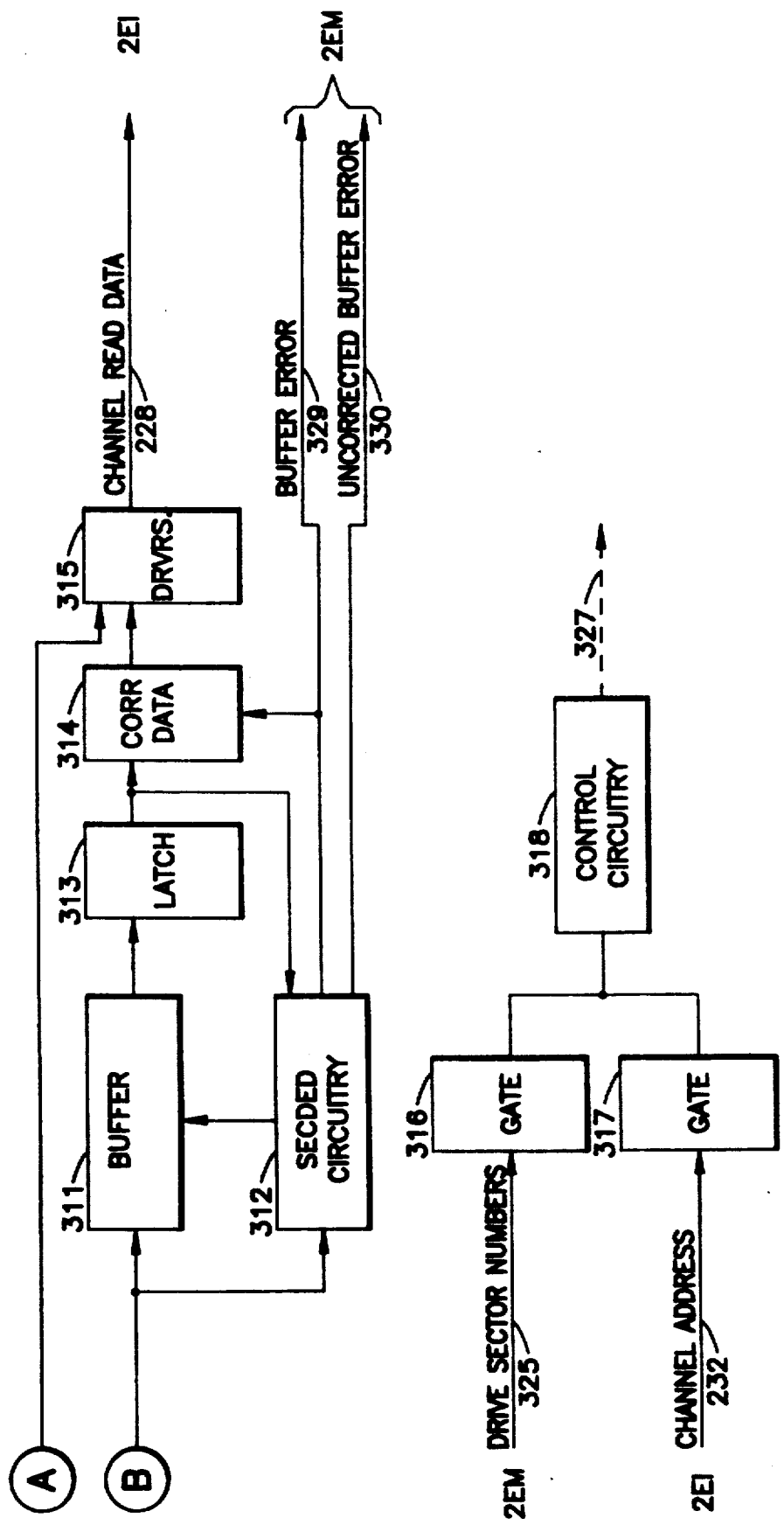

FIGS. 3A and 3B combined are a schematic block diagram of the 2EB full-track buffer module 104. The 2EB full-track buffer 104 coordinates four independent data streams written to or read from each individual disk drive 108a-108d. The 2EB full-track buffer 104 serially combines four sets of 12 sectors per drive into one logical 48 sector track. When a 16-bit parcel of data is received on Cable 110, the 2EI channel interface 103 sends it to the 2EB full-track buffer 104. When one complete sector is contained in the 2EB full-track buffer 104, it can be transmitted to a disk drive within the array 108. Conversely, once a full sector of data is received from a disk drive, it can begin transferring to the host computer 111 via Cable 109.

Data from the 2EI channel interface 103 enters on line 233, is selected by multiplexor circuit 309, and is latched into 310. From there, the data enters the single-error correction double-error detection (SECDED) circuit 312 where check bits are generated. The data, along with the check bits for each parcel, is then written into the buffer 311. Buffer 311 is the dual bank buffer described herein after in conjunction with FIG. 4.

When one complete sector is written to buffer 311, it can be transferred to a disk drive within the array 108. Data is read from the buffer 311 and into the latch 313. The latch 313 sends the data, along with the check bits, to the SECDED circuitry 312. The data is also sent to the correction circuitry 314. If a single-bit error is detected by SECDED circuitry 312, the data is corrected at the correction circuitry 314. The data is held at latch 313 for four clock periods. This gives the SECDED circuitry 312 time to perform any corrections at 314.

When the corrected data is transferred to a disk drive within the array 108, it is transmitted via bus 322 to registers 305, 306, 307, or 308. From these registers the data is latched into shift registers 301, 302, 303, or 304 and then transmitted serially to an individual disk drive within the array 108. For example, from register 305 data is latched into shift register 301. The data in shift register 301 is transferred out in a serial stream. Each bit of the data leaves shift register 301 through driver 319a. From there, the data traverses the 2EK disk-data and error-correction module 106 which generates the error correction code (ECC), and goes to the disk drive 108a. Data directed at the other disk drives within the array 108 is handled in a similar fashion.

Data received from the disk drives in the array 108 enters the 2EB full-track buffer 104 in a serial stream. Each bit enters the shift registers 301, 302, 303, or 304, where it is shifted until a complete 16-bit parcel is assembled. The parcel is loaded into a corresponding register 305, 306, 307, or 308, and the next parcel may begin entering the shift register. Once a parcel resides in one of the data registers 305 through 308, the register is selected by multiplexor circuit 309 and the contents of the register are latched into 310. The data enters the buffer 311 and is presented to the SECDED circuitry 312 to generate the check bits. Once a full sector of data is assembled in buffer 311, it can be transferred to the host computer 111.

When data is read out of buffer 311, it enters the latch 313. The data passes through the SECDED circuitry 312 to check for data errors. If a single-bit error is detected, the data is corrected at correction circuitry 314 and a Buffer Error signal 329 is sent to the 2EM disk multiplexor 105. If an uncorrectable error is detected, an Uncorrected Buffer Error signal 330 is sent to the 2EM disk multiplexor 105. In turn, both signals are sent to the 2EI channel interface 103, where they become part of the error status transmitted to the host computer 111. The data is transmitted to the 2EI channel interface 103 via drivers 315 and lines 228.

Addressing for the dual banks within buffer 311, is controlled by circuit 318. Circuit 318 has as its input either the drive sector number via line 325 and circuit 316 or the channel address via line 232 and circuit 317.

Figure 4:
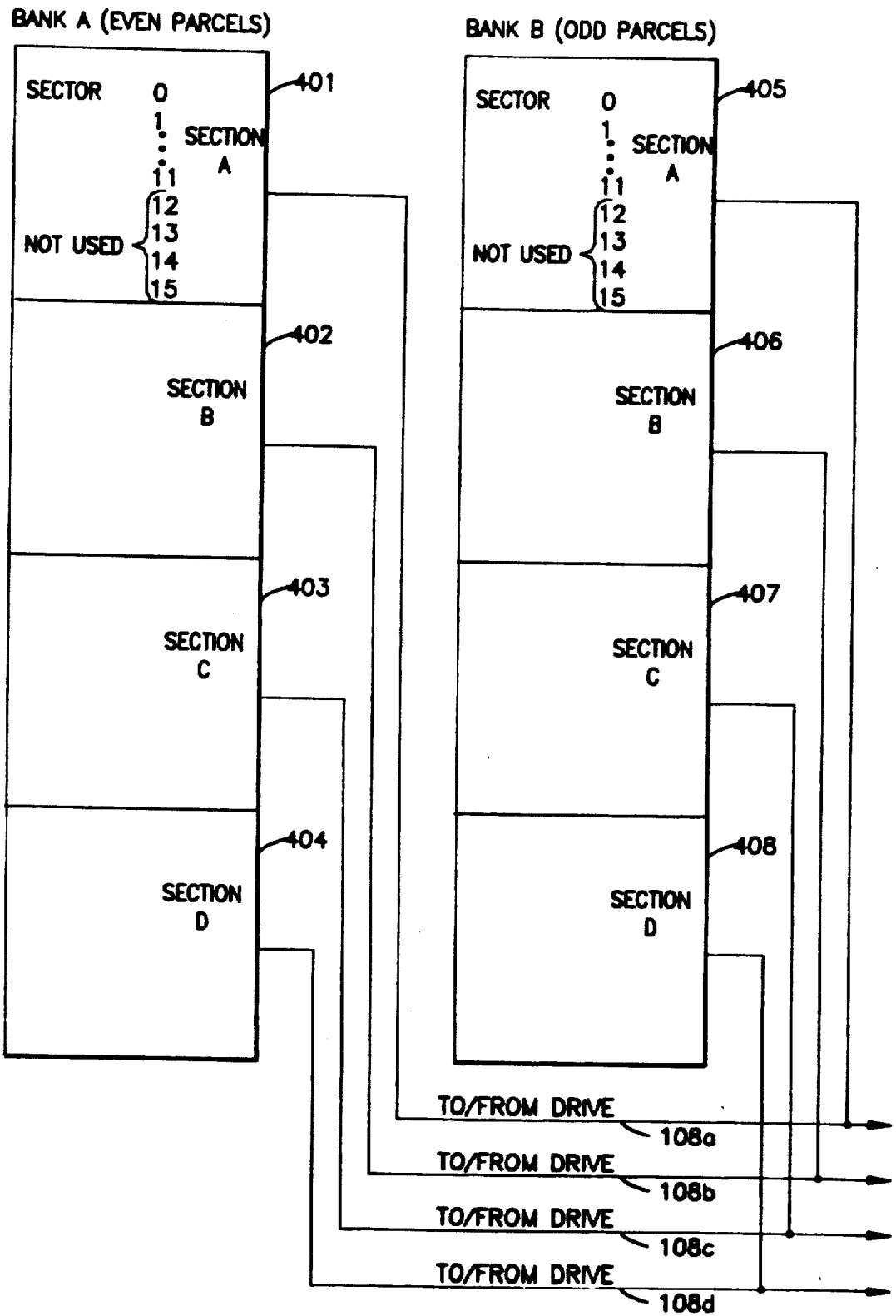
FIG. 4 is a block diagram of the banks and sections that comprise the 2EB full-track buffer.

FIG. 4 more fully describes the buffer 311 and the addressing method used by the 2EB full-track buffer 104. The 2EB full-track buffer 104 has two banks of memory, labelled in FIG. 4 as Bank A and Bank B. Each disk drive uses a specified section of each bank. For example, disk drive 108a uses the first 16 sectors of the buffer, labelled as 401 in Bank A and 405 in Bank B; disk drive 108b uses the second 16 sectors, labelled as 402 in Bank A and 406 in Bank B; and so on. Note that while space for 16 sectors per disk drive is provided, only the first twelve sectors of each of the sections 401 through 408 are used in this preferred embodiment. The data is split between Bank A and Bank B, so that Bank A contains even numbered parcels and Bank B contains the odd numbered parcels. As data is received by the 2EB full-track buffer 104, the first 16-bit parcel enters Bank A and the second 16-bit parcel for the same sector enters Bank B in the same location as Bank A. Data transfers to or from each section occur independently of the other sections. The 2EB full-track buffer 104 is also capable of performing channel transfers simultaneously while performing disk transfers. Thus, the present invention can achieve and sustain high data transfer rates.

Accessing each buffer location requires a 16-bit address value. The least significant bit of the address value selects the bank within the 2EB full-track buffer 104: 0 for Bank A; 1 for Bank B. The next 9 bits identify the particular parcel location with a sector. The following 4 bits identify the sector number. Finally, the last 2 bits identify the section of the 2EB full-track buffer 104 associated with a particular disk drive.

Figure 5:
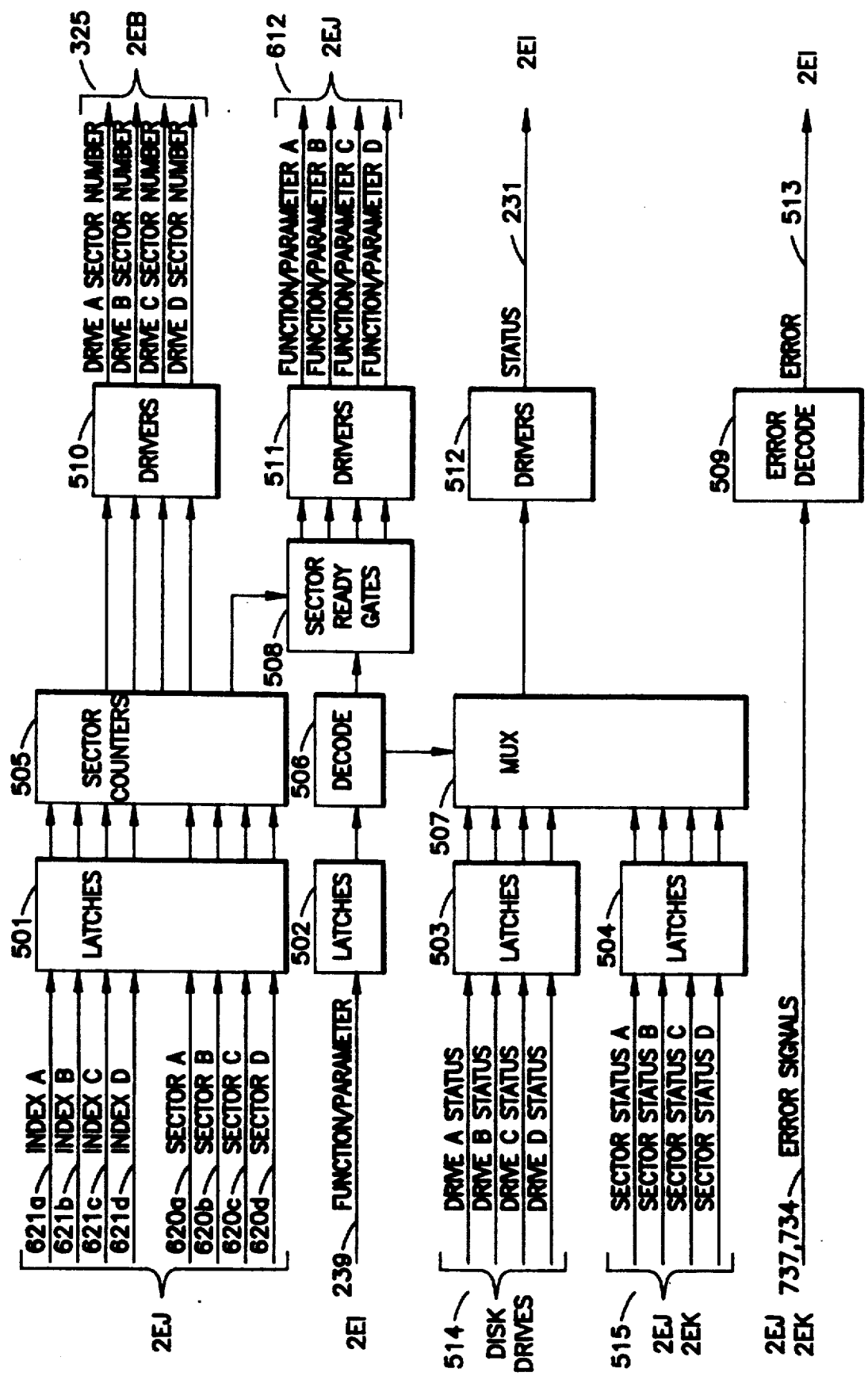
FIG. 5 is a schematic block diagram of a 2EM disk multiplexor module.

FIG. 5 is a schematic block diagram of the 2EM disk multiplexor 105. The 2EM disk multiplexor 105 keeps track of what sectors reside in the 2EB full-track buffer 104. The 2EM disk multiplexor 105 also controls Read and Write transfers to the four disk drives 108a-108d. Data does not pass through the 2EM disk multiplexor 105, instead, only the function code is accepted by the 2EM disk multiplexor 105. In turn, the 2EM disk multiplexor 105 sends corresponding commands to the four 2EJ controller modules 107a-107d. The 2EM disk multiplexor 105 decodes the function codes and function parameters to control Read and Write transfers into and out of the 2EB full-track buffer 104.

The 2EM disk multiplexor 105 has sector counters 505 for each disk drive. These sector counters 505, along with the Sector Ready flags 508, determine what Read/Write commands to transmit to the 2EJ disk controllers 107a-107d. The sector counters 505 use the Index 621 and Sector 620 data from the disk drives, sent via the 2EJ disk controllers, to control storage of data in the 2EB full-track buffer 104 and the disk drives.

The 2EM disk multiplexor 105 receives the function code and a "Go" indicator on line 239 from the 2EI channel interface 103. The function code and "Go" indicator are followed on line 239 by the 16 bit function parameter, 4 bits in each of the four subsequent clock periods. Both the function code and the function parameter are latched in 502. The function code and function parameter are decoded at 506 to determine what kind of function is being executed.

The function code and function parameter are sent to the appropriate 2EJ disk controller module within 107 via circuit 508 and driver 511. Lines 612a through 612d correspond to the 2EJ disk controller modules 107a–107d. This transfer occurs in 4-bit nibbles.

The 2EM disk multiplexor 105 receives status signals 514 and 515 or error signals 737 and 734 from the 2EJ disk controllers within 107, after each function is carried out. Drive status signals 514a through 514d from the four disk drives, 108a through 108d, are latched into 503. The corresponding sector status signals 515a through 515d are latched into 504. The decode circuitry 506 selects the desired drive status and sector status via multiplexor circuit 507. Error values are ORed together with status information if they are not Read/Write errors. If the error values are Read/Write errors, then only the error information is stored in the status buffers. Disk drive error signals 737 and 734 are decoded by circuit 509. The 2EM disk multiplexor 105 sends error and status data to the 2EI channel interface 103 via lines 231 and 513, respectively. The status and error data is transmitted to the host computer 111 only when the corresponding data is transferred from the 2EB full-track buffer 104. If an error occurs while reading a disk drive, but the erroneous data is never requested by the host computer 111, no error information is transmitted. However, the error information for each sector in the 2EB full-track buffer 104 can be read independently of the data using certain commands.

Circuit 508 manages 48 Sector Ready flags, each corresponding to a specified sector of the logical 48 sector track. The Sector Ready flags indicate whether a sector of data stored in the 2EB full-track buffer 104 is the same as the corresponding sector of data residing at the current head and cylinder address on the disk drive. If both sectors of data are identical, then the Sector Ready flag is set. If the data is different, then the Sector Ready flag is cleared. The sectors of data may differ because new data is being written by the host computer 111 or the head address of the disk drive has changed.

During a WRITE or READ operation, the 2EM disk multiplexor 105 enhances performance by taking advantage of the parallelism available across section boundaries of the 2EB full-track buffer 104. As described herein before, each section boundary in the 2EB full-track buffer 104 identifies one of the four asynchronously-operating disk drives in the array 108. Parallelism is also available on sector boundaries of the 2EB full-track buffer 104 because data transfers can occur when a sector of data is completely stored in the 2EB full-track buffer 104. In addition, the 2EM disk multiplexor may select a new head during an operation, as long as it does not change the position the Read/Write heads of the disk drive.

When a WRITE command is received, the sector and addresses are analyzed to determine whether data can be written directly into the 2EB full-track buffer 104. The Sector Ready flag for the sector in the 2EB full-track buffer 104 is checked, to see if it has been cleared. If cleared, then the data in the sector must be written to disk before more data can be accepted. If the head address changes, all remaining sectors for the previous head address must be written to disk before new data is accepted. The preferred embodiment allows only sectors from a common head address to be stored in the disk drive's section of the 2EB full-track buffer 104 at any one time. This requires that all data at the current head address be written to disk before any new sectors at a new head address are stored in the 2EB full-track buffer 104. Those skilled in the art will recognize that additional logic in the 2EM disk multiplexor 105 could remove this restriction. If an error occurs while data is being written to a disk, the entire 2EB full-track buffer 104 is written to the four disk drives 108a–108d, before the current sector write is allowed to finish, at which time the DONE and ERROR lines will be asserted. The host computer 111 must be notified as soon as possible that an error occurred while writing to a disk drive. At the same time, an effort must be made to write all data currently in the 2EB full-track buffer 104 to the four disk drives 108a–108d. The status buffer after such a write error is used to determine which sector actually had the write error, since the writes to the disk drives 108a–108d are out of sequence with regard to the order in which the data was sent by the host computer 111.

During a READ operation, with the Read-Ahead option enabled, the 2EM disk multiplexor 105 is constantly trying to anticipate what data will be requested next by the host computer 111. The most commonly requested sequence is assumed to be sequential head selection. Therefore, the 2EM disk multiplexor 105 automatically reads in a full physical track of data from the next sequentially addressed Read/Write head when the Read-Ahead option is enabled. Any departure by the host computer 111 from sequential head selection, or any change in cylinder number while the 2EB full-track buffer 104 is filling, will cause the 2EM disk multiplexor 105 to clear the Sector Ready flags for the data stored in the 2EB full-track buffer 104.

FIG. 8 is a boolean logic truth table for the "Buffer Fill" algorithm associated with the Read-Ahead option. As discussed herein before in conjunction with FIG. 4, the last 2 bits of the 16-bit address value identify one of the four sections in the 2EB full-track buffer 104 associated with a particular disk drive 108a–108d. The algorithm compares the previous READ address value with the current READ address value transmitted by the host computer 111. As a result of this comparison, the appropriate Sector Ready flags may be cleared. In FIG. 8, the columns labeled "C15" and "C14" are the section-identifying bits of the previous READ address. The columns labeled "A5" and "A4" are the section-identifying bits of the current READ address. The column K0 represents the clear term for the Sector Ready flags for Section 0 (disk drive 108a—logical sectors 0–11); the column K1 represents the clear term for the Sector Ready flags for Section 1 (disk drive 108b—logical sectors 12–23); column K2 represents the clear term for the Sector Ready flags for Section 2 (disk drive 108c—logical sectors 24–35); column K3 represents the clear term for the Sector Ready flags for Section 3 (disk drive 108d—logical sectors 36–47). An "H" in a column means that the corresponding Sector Ready flags will be cleared if the current head address does not equal the previous head address. A "1" in the column means that the corresponding Sector Ready flags will be cleared regardless of the head address. After the Sector Ready flags for a particular section are cleared by the algorithm, the 2EM disk multiplexor 105 reads the corresponding disk drive for more data to transfer into the section. The 2EM disk multiplexor 105 has sector counters 505 that indicate the current disk position. During Read-Ahead, any Sector Ready flag and sector number match means a READ gets issued to a 2EJ disk controller 107. The 2EM disk multiplexor 105 begins reading from the current disk position and loads data from the last head and sector position, up through the end of the current physical track. The head position is then incremented and the 2EM disk multiplexor 105 reads from first sector of the new physical track, up through subsequent sectors until one full physical track has been loaded into the corresponding section of the 2EB full-track buffer 104. Thus, the 2EM disk multiplexor 105 anticipates subsequent READ requests from the host computer 111 and attempts to keep the 2EB full-track buffer 104 filled with data. Those skilled in the art will recognize that alternatives exist to the granularity of the "Buffer Fill" algorithm in the preferred embodiment of the present invention. For example, a READ address value that crosses a sector boundary, rather than a section boundary, could be used to trigger the "Buffer Fill" algorithm.

Figure 6:
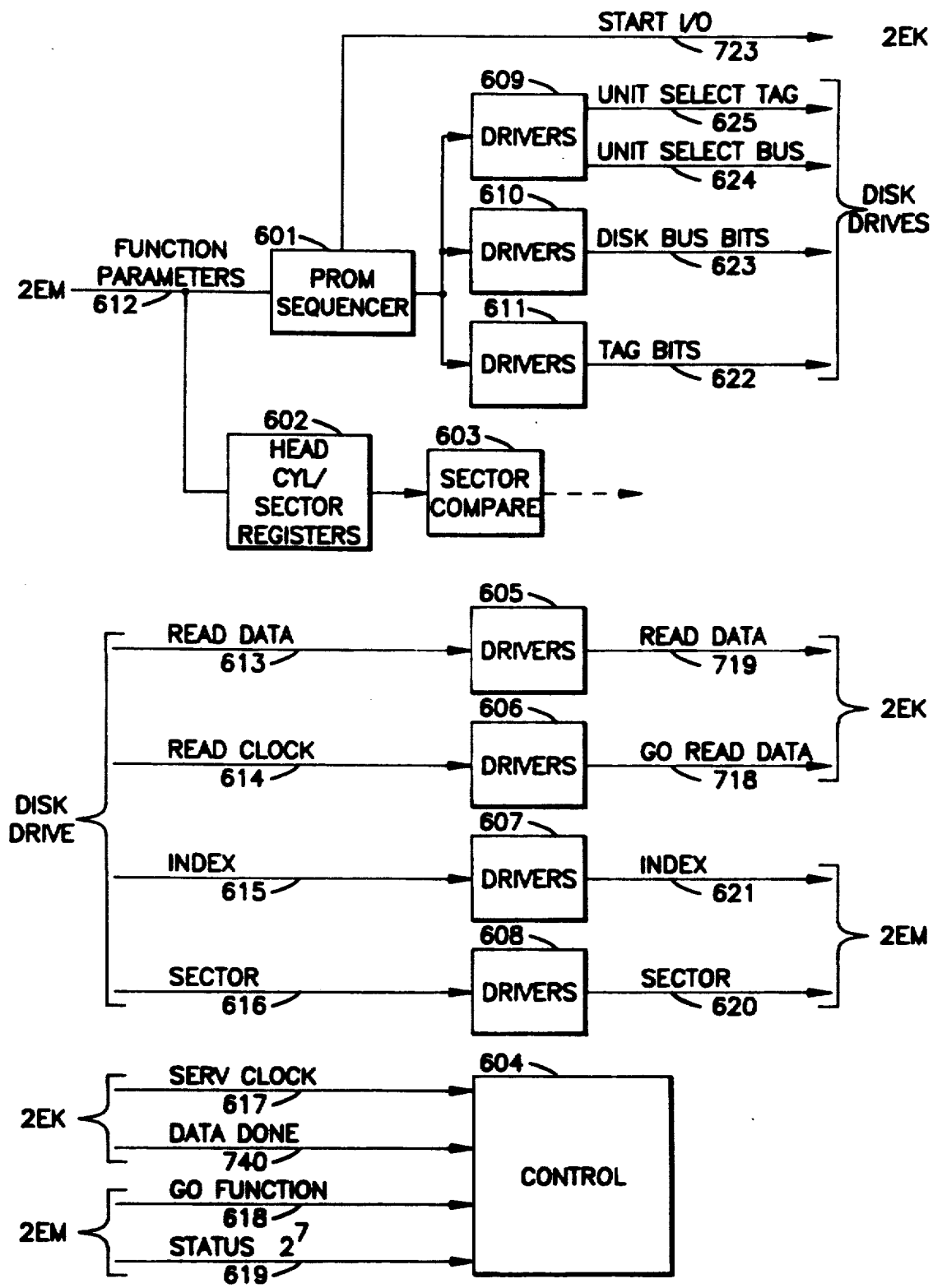
FIG. 6 is a schematic block diagram of a 2EJ disk controller module.

FIG. 6 is a schematic block diagram of one 2EJ controller module within 107. Each 2EJ controller module 107a through 107d receives a function code and a "Go" indicator from the 2EM disk multiplexor 105. Included with the function code is a parameter specifying the head cylinder, sector, and so on. The individual 2EJ controller modules within 107 then instruct their corresponding disk drive within 108 to complete the desired operation. Each 2EJ controller module within 107 and each disk drive within 108, operate as a pair independently of the other pairs. For example, 2EJ controller module 107a is associated, and deals exclusively, with disk drive 108a. After selecting a Read/Write head and positioning to the correct track, the 2EJ controller module 107a will use both the Index and Sector signals generated by disk drive 108a to orient itself regarding the location of data. When the desired location is reached, the 2EJ controller module 107a commands disk drive 108a to Read or Write data. During a Read operation, disk drive 108a will recover data and transmit it serially to the 2EJ controller module 107a. During a Write operation, the disk drive 108a receives serial data from the 2EJ controller module 107a and stores it.

The heart of the 2EJ disk controller module 107 is the programmable read only memory (PROM) sequencer 601. The PROM sequencer 601 is "burned" at the factory with the microcode that determines the control sequences for the disk drive. Each address of the PROM contains a combination of bits that becomes the combination of control signals to the disk drive. The PROM sequencer 601 outputs 32 bits of information for each address input. These 32 bits become the UNIT SELECT TAG 625, UNIT SELECT BUS 624, DISK BUS 623, and TAG 622 signals.

Two cables connect the disk controller 101 to each individual disk drive within the array 108: a control cable and a read/write cable. The control cable is comprised of UNIT SELECT TAG 625, UNIT SELECT BUS 624, DISK BUS 623, TAG 622, and SERVO CLOCK 617 (shown in FIG. 7A). The read/write cable contains the signals READ CLOCK 614, READ DATA 613, WRITE CLOCK 738 (shown in FIG. 7A), WRITE DATA 736 (shown in FIG. 7A), INDEX 615, and SECTOR 616.

During drive selection, each disk drive compares its manually set address with the value indicated by the UNIT SELECT signals. If the values match, the selected disk drive recognizes that the 2EJ disk controller within 107 wishes to converse with it.

The TAG signals indicate the type of function to be performed by the disk drive within 108. $TAG_0$ tells the disk drive to move its read/write head to the location indicated by the address represented by the signals on DISK BUS 623. $TAG_1$ indicates which Read/Write head to use on the data transfer operation. The head group is indicated by the value conveyed by the signals on DISK BUS 623. The signal $TAG_2$ indicates that the signals represented by DISK BUS 623 should be interpreted by the disk drive within 108 as a function code such as READ, WRITE or some other command.

When control signal $TAG_2$ indicates a function, and the DISK BUS signals 623 indicate a WRITE operation, then the WRITE CLOCK signal 738 provides the timing pulse for the WRITE DATA line 736. Data is transmitted to the disk drive on the WRITE DATA line 736. The DISK BUS signals 623 will tell the disk drive to enable its WRITE circuitry to convert the data on the WRITE DATA line 736 to current reversals in the READ/WRITE head, thereby recording information on a selected track on the disk stack.

When the control signal $TAG_2$ indicates a function, and the DISK BUS signals 623 indicate a READ operation, the READ CLOCK signal 614 provides the timing pulse for the signal READ DATA 613. Data is transmitted to the 2EJ disk controller module 107 on the READ DATA line 613. The DISK BUS 623 signals will cause the disk drive within 108 to enable its READ circuitry to convert the analog information recorded on a given track to digitized data which is transmitted through the READ DATA line 613 back to the 2EJ disk controller module 107.

When the $TAG_2$ signal 622 indicates a function and the DISK BUS signals 623 indicate a REZERO operation, the disk drive head positioner will reposition to cylinder zero.

The function code and function parameter are received from the 2EM disk multiplexor 105 on line 612. The function parameter specifies the mode, head, cylinder, sector and so on. As these parameters arrive at the 2EJ disk controller module 107, they are entered into registers 602. The "Go" function signal 618 received from the 2EM disk multiplexor 105 allows the 16-bit function code received on 612 to be used as the first address for the PROM sequencer 601. Subsequent addresses for the PROM sequencer 601 come from the PROM sequencer's Next Address field. The PROM sequencer 601 continues using the Next Address field as input until it comes to a Next Address field containing all zeros, which returns the PROM sequencer 601 to the idle loop.

Read Data 613, Read Clock 614, Index 615 and Sector 616 are all received from the disk drive 108. The Index 615 and Sector 616 from the disk drive are fed into the Sector Compare circuit 603. The Sector Compare circuit 603 compares the desired sector number for the current operations with the sector presently passing beneath the Read/Write heads. The Index and Sector signals are also transferred to the 2EM disk multiplexor 105 on lines 620 and 621 to provide timing signals for the Read/Write operations.

Figure 7A:
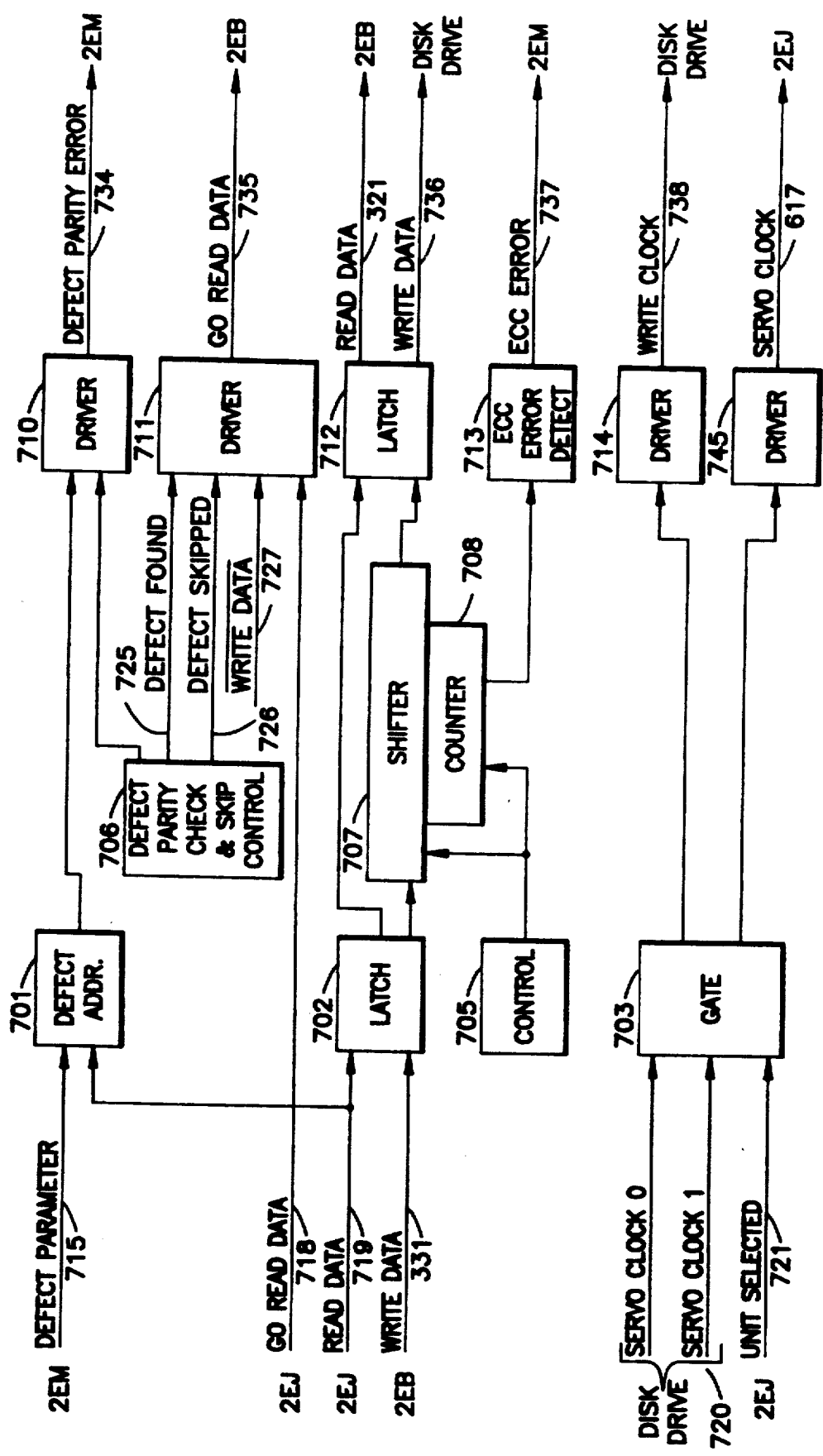
FIGS. 7A and 7B combined are a schematic block diagram of one quarter a 2EK disk-data and error-correction module.
Figure 7B:
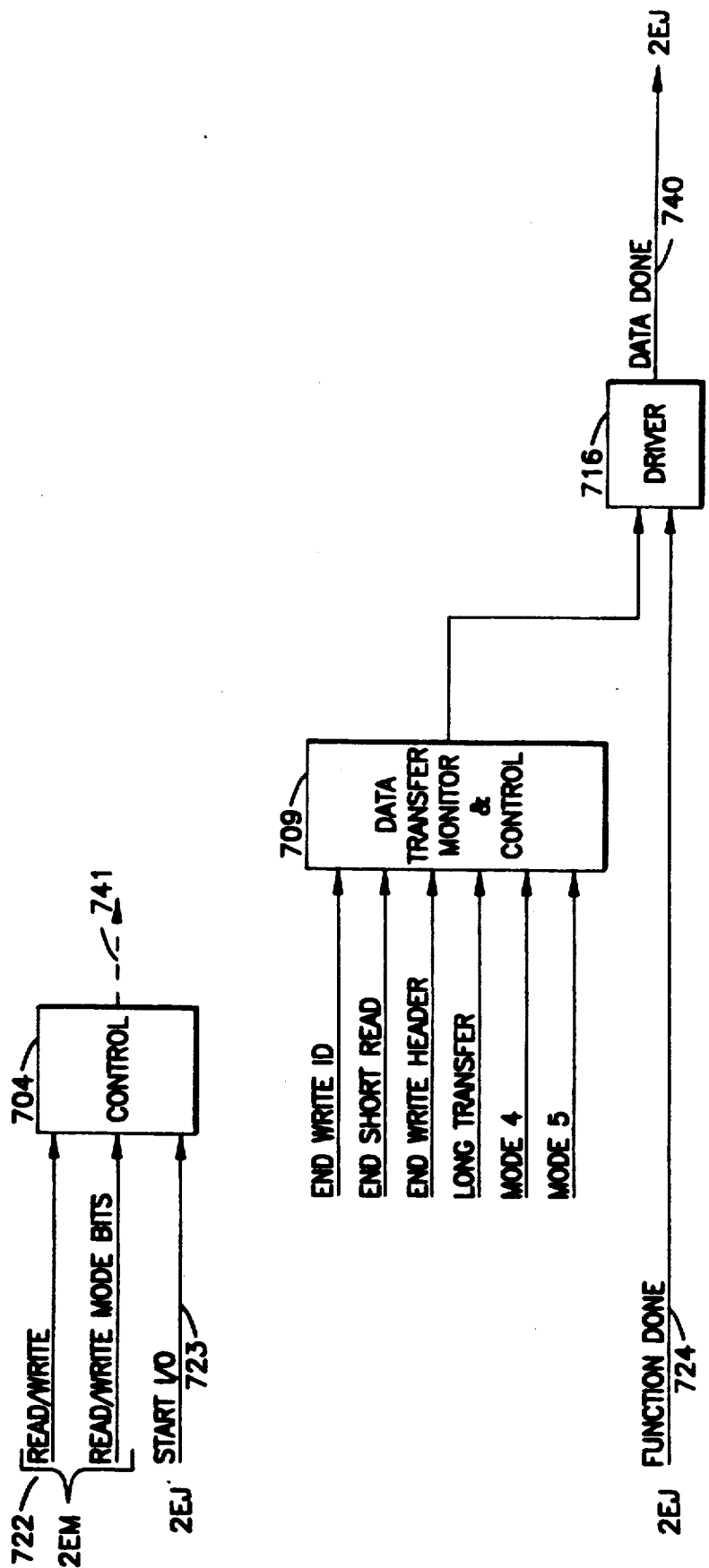

FIGS. 7A and 7B combined are a schematic block diagram of the 2EK disk-data and error-correction module 106. The 2EK disk-data and error-correction module 106 performs error correction, defect detection and defect skipping. The 2EK disk-data and error-correction module 106 is divided into four identical sections, each section handling Read data and Write data for one disk drive within the array 108. FIGS. 7A and 7B combined illustrate one of the four sections.

The 2EK module 106 receives Write data from the 2EB full-track buffer 104 one bit at a time on line 331. Each bit is latched at 702 and then transmitted to a 32-bit linear feedback shifter 707. Simultaneously, the bit is sent to latch 712 as output to the disk drive within 108. As a complete sector of data passes through the 2EK module 106 on its way to the disk drive within 108, the shifter 707 continues to shift. When a full sector of data has been sent to the disk drive within 108, the shifter 707 will contain a 32-bit error correction code (ECC) unique to the data pattern just written. The 32-bit ECC is written to the disk drive within the array 108 immediately following the data.

The data takes a similar path on a Read operation. The data is received from the 2EJ disk controller module within 107 one bit at a time on line 719. The data again is latched at 702 and then transmitted to shifter 707. Shifter 707 performs exactly the same operation on the Read operation as it did on the Write operation. After all data has been read, the shifter 707 should contain the same 32-bit ECC as was generated on the Write operation. The 32-bit ECC is read from the disk drive 108 immediately following the read of the data. If the sector of data had no errors, the corresponding ECC's cancel out as they go through a subtraction operation at 708. The result should be all zeros, indicating no error was detected. (Note that the starting value of the shifter is all zeros). If an error was detected, the 2EK module 106 indicates an ECC error to the 2EM disk multiplexor 105 via 713 and line 737.

In addition, as shown in FIG. 7A, defect parameter signal if applied via line 715 to defect adder along with read data on line 719. Defect adder 701 outputs a signal to driver 710. Defect parity check and skip control 706 also applies an output signal to driver 710 which applies a defect parity error 734 to 2EM disk multiplexor. The defect parity check and skip control 706 further outputs defect found signal on line 725 and defect skipped signal on line 726; both applied a write data signal 727 and go read data signal 718 from the 2EJ disk controllers to driver 711. Driver 711 applies a go read data signal 735 to the 2EB full track buffer.

Also, servo clock signals 720 are applied along with unit selected signals 721 from the 2EJ disk controllers to gate 703. Gate 703 provides a write clock signal 738 to the disk drives via driver 714 and a servo clock signal 617 to the 2EJ disk controllers via driver 745.

Further, as shown in FIG. 7B, read/write signals and read/write mode bits signals 722 from 2EM disk multiplexor are applied to control 704 along with start I/O signal 723 from the 2EJ controllers, FIG. 6. Signal 741 is output from control 704. The 2EJ disk controllers also apply a function done signal 724 to driver 716. An output signal from data transfer and monitoring control circuit 709 is also provided to driver 716 which in turn applies a data done signal 704 to the 2EJ disk controllers. End write ID signals, end short read signals, end right header signals, long transfer signals, mode 4 signals, and mode 5 signals are applied to data transfer and monitoring control circuit 709.

Although the present invention has been described herein in its preferred embodiment, those skilled in the art will recognize various modifications could be made thereto without departing from the spirit and scope of the invention as set forth in the claims amended hereto.

What is claimed is:

1. A high speed data storage device for a computer, comprising:
   (a) a plurality of disk drives;
   (b) memory means, operatively connected to the computer by channel interface means for transferring data therebetween, for storing a logical track of data, said logical track comprising a plurality of sections corresponding to said plurality of disk drives for storing data of said disk drives, each section comprising a plurality of sectors, said memory means further including address control means for addressing said memory means;
   (c) a plurality of disk drive controllers, each connected to a corresponding section of the memory means and to a corresponding one of the disk drives, for instructing the disk drives to complete desired operations, said disk drive controllers and said channel interface means providing input to said address control means for allocating locations in said memory means for data storage; and
   (d) disk multiplexor means, connected to the disk drive controllers, for controlling transfers of data between the disk drives and the memory means, the disk multiplexor means comprising:
     (1) means for receiving a command from the computer to request data transfer between the high speed data storage device and the computer, the command including a read/write head selection, a track position and a logical track sector position utilized to allocate locations in said memory means for data storage;
     (2) means for transmitting the read/write head selection and the track position to the disk drive controllers to instruct the disk drives to select a read/write head and position the read/write head to the track position;
     (3) means for selecting a disk drive and a sector position of the selected disk drive based on said logical track sector position; and
     (4) means for transmitting the disk drive selection and sector position to the disk drive controllers for controlling transfer of data between the read/write head at said track position and sector position of the selected disk drive and the logical track of the memory means.

2. The high speed data storage device of claim 1, wherein the disk multiplexor means further comprises means for controlling transfer of data between each of the disk drives and the memory means simultaneously.

3. The high speed data storage device of claim 1, wherein the disk multiplexor means further comprises:
   means for determining from sector information of the logical track of data stored in the memory means and commands received from the computer whether data of the logical track must be stored to the disk drives prior to accepting additional data into the memory means from the computer; and
   means for controlling storage of the data of the logical track to the disk drives in response to the determining means via the disk drive controllers.

4. The high speed data storage device of claim 1, wherein the disk multiplexor means further comprises:
   (5) means for receiving and storing status and error information from the disk drive controllers concerning particular data transferred from the disk drives to the memory means; and
   (6) means for transmitting the status and error information to the computer when the particular data is transferred from the memory means to the computer.

5. The high speed data storage device of claim 4, wherein the disk multiplexor means further comprises means for transmitting the status and error information received from the disk drive controllers to the computer without transmitting the particular data from the memory means to the computer.

6. The high speed data storage device of claim 1, wherein the disk multiplexor means further comprises read-ahead means for requesting the disk drive controllers to control a transfer of data from a next sequential read/write head in anticipation of a next command from the computer, said disk drive controllers controlling the transfer of data to the memory means in response to the request.

7. The high speed data storage device of claim 6, wherein the read/ahead means further comprises means for transferring a full track of data from at least one of the disk drives to the memory means using the next sequential read/write head.

8. A read-ahead method for a data storage device for a computer, the data storage device having a buffer for storing data from a plurality of disk drives, the buffer being divided into a plurality of successively numbered sections having sectors therein, the sections having a one-to-one correspondence with the disk drives so that each section stores data retrieved from one of the disk drives, each sector having a valid data flag that when set indicates that data can be read from the corresponding sector of the buffer by the computer and that when cleared indicates that data is to be read from one of the disk drives to be transferred to the corresponding sector of the buffer, the computer transmitting read requests to the data storage device, the read-ahead method comprising the steps of:

(a) comparing a current read request with a prior read request, wherein the current read request is comprised of a current read/write head selection and a current logical track sector position indicative of a current section location, and wherein the prior read request is comprised of a prior read/write head selection and a prior logical track sector position indicative of a prior section location;

(b) clearing the valid data flats for all sectors in all sections when the current read/write head selection differs from the prior read/write head selection;

(c) clearing the valid data flags for all sectors in sections numbered between the prior section location and the current section location, including the valid data flags for sectors in the section of the prior section location, when the current read/write head selection is the same as the prior read/write head selection and the current section location is a higher value than the prior section location;

(d) clearing the valid data flags for all sectors in sections numbered between the prior section location and a highest section number, including the valid data flags for sectors in the sections of the prior section location and the highest section number, and clearing the valid data flags for all sectors in sections numbered between a lowest section number and the current section location including the valid data flags for sectors in the section of the lowest section number unless the lowest section number is equal to the current section location, when the current read/write head selection is the same as the prior read/write head selection and the current section location is a lower value than the prior section location;

(e) clearing the valid data flags for all sectors in all sections when the current section location is equal to the prior section location only when the current read/write head selection differs from the previous read/write head selection;

(f) reading data from sectors identified on the disk drives into the buffer from sectors numbered greater than or equal to a current sector location, when the sections to which the data is to be stored have sectors with cleared valid data flags, using a read/write head specified by the current read/write head selection, and then setting the valid data flags for the sectors of the sections to which the data is stored; and (g) reading data from sectors identified on the disk drives into the buffer from sectors numbered lower than the current sector location, when the sections to which the data is to be stored have sectors with cleared valid data flags, using a next read/write head specified by a next read/write head selection sequential to the current read/write head selection, and then setting the valid data flags for the sectors of the sections to which the data is stored.

* * * * *

UNITED STATES PATENT AND TRADEMARK OFFICE
CERTIFICATE OF CORRECTION

PATENT NO. : 5,218,689

DATED : June 8, 1993

INVENTOR(S) : Thomas G. Hotle

It is certified that error appears in the above-identified patent and that said Letters Patent is hereby corrected as shown below:

In column 2, line 30, "2IE" should read -- 2EI --. therefore.

In column 2, line 40, insert --of-- after the word "quarter" therefore.

In column 5, line 63, "The Bus Out" should not start a new paragraph therefore.

In column 9, line 56, insert --of-- after the word "position" therefore.

In column 13, line 34, "if" should read --is-- therefore.

In column 15, line 48 (claim 8), "flats" should read -- flags-- therefore.

Signed and Sealed this

Fifth Day of April, 1994

Attest:

BRUCE LEHMAN

Attesting Officer

Commissioner of Patents and Trademarks